(12) United States Patent
Cope et al.

(10) Patent No.: US 6,378,946 B1
(45) Date of Patent: Apr. 30, 2002

(54) SEAT BACKREST FRAME

(75) Inventors: Matthew Alan Cope, Somerville;
Morris Taylor Murray, Briar Hill;
Mark Paul Spataro, Avondale Heights;
Martin Raymond Young, Ocean
Grove, all of (AU)

(73) Assignee: Henderson's Industries PTY Ltd.,
Victoria (AU)

( * ) Notice: Subject to any disclaimer, the term of this patent is extended or adjusted under 35 U.S.C. 154(b) by 0 days.

(21) Appl. No.: 09/269,796

(22) PCT Filed: Oct. 3, 1997

(86) PCT No.: PCT/AU97/00660

§ 371 Date: Aug. 17, 1999

§ 102(e) Date: Aug. 17, 1999

(87) PCT Pub. No.: WO98/15422

PCT Pub. Date: Apr. 16, 1998

(30) Foreign Application Priority Data

Oct. 4, 1996 (AU) ............................................. PO2747

(51) Int. Cl.[7] .............................. A47C 7/02; A47C 7/40
(52) U.S. Cl. .............................. 297/452.2; 297/452.18; 297/452.3
(58) Field of Search .................... 297/284.4, 452.18, 297/452.2, 452.29, 452.3, 452.31

(56) References Cited

U.S. PATENT DOCUMENTS

| 4,373,245 A | 2/1983 | Volpe |
| 4,544,204 A | 10/1985 | Schmale |
| 5,044,693 A | * 9/1991 | Yokota .................. 297/452.18 |
| 5,123,706 A | 6/1992 | Granzow et al. |
| 5,412,860 A | 5/1995 | Miyauchi et al. |
| 5,499,863 A | * 3/1996 | Nakane et al. ......... 297/452.18 |
| 5,547,259 A | 8/1996 | Fredrick |
| 5,641,205 A | * 6/1997 | Schmidt .................. 297/284.4 |

FOREIGN PATENT DOCUMENTS

| DE | 4238549 | 5/1994 |
| EP | 0372339 | 6/1990 |
| WO | 9524144 | 9/1995 |
| WO | 9602166 | 2/1996 |

* cited by examiner

*Primary Examiner*—Anthony D. Barfield

(57) ABSTRACT

A seat backrest frame (10) having an integrally formed rigid peripheral frame structure which, relative to an in-use orientation, has a plurality of frame portions, namely a pair of side portions (20) and transverse portions (22 and 24). Each of the frame portions (20, 22 and 24) has an elongate channel form defined by respective side flanges (20a, 22a, 24a, 20b, 22b, 24b), and an interconnecting web (20c, 22c, 24c). Each web (20c, 22c, 24c) being disposed forwardly of the frame structure with the channel of each frame portion opening rearwardly. Each side portion (20) defines a forwardly projecting wing (36) over at least the lower half of its length, such that the depth of each side portion channel in at least the region of the wing (36) is substantially greater than the depth of the channels of the transverse portions (22 and 24).

28 Claims, 3 Drawing Sheets

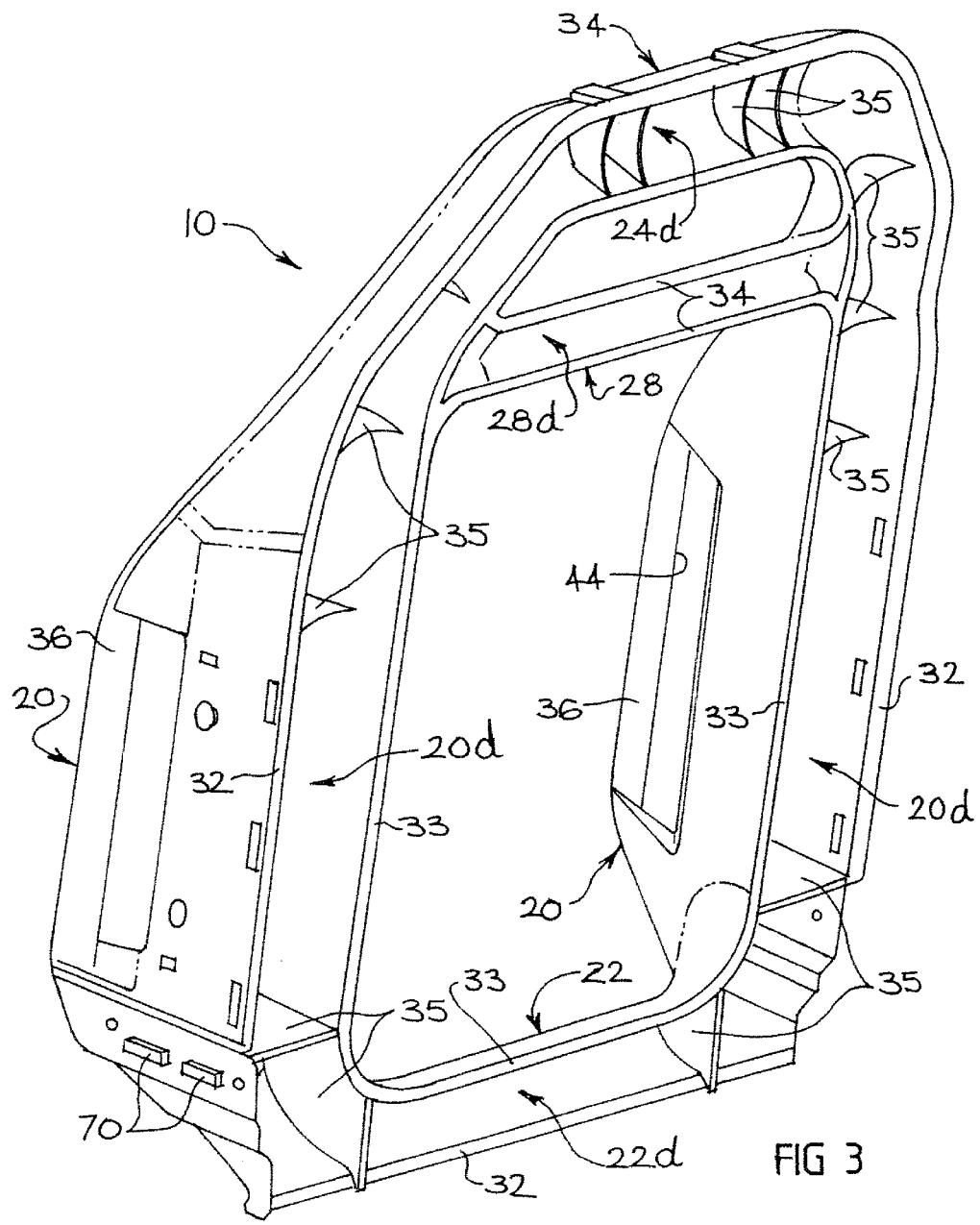

SEAT BACKREST FRAME

Figure 1:
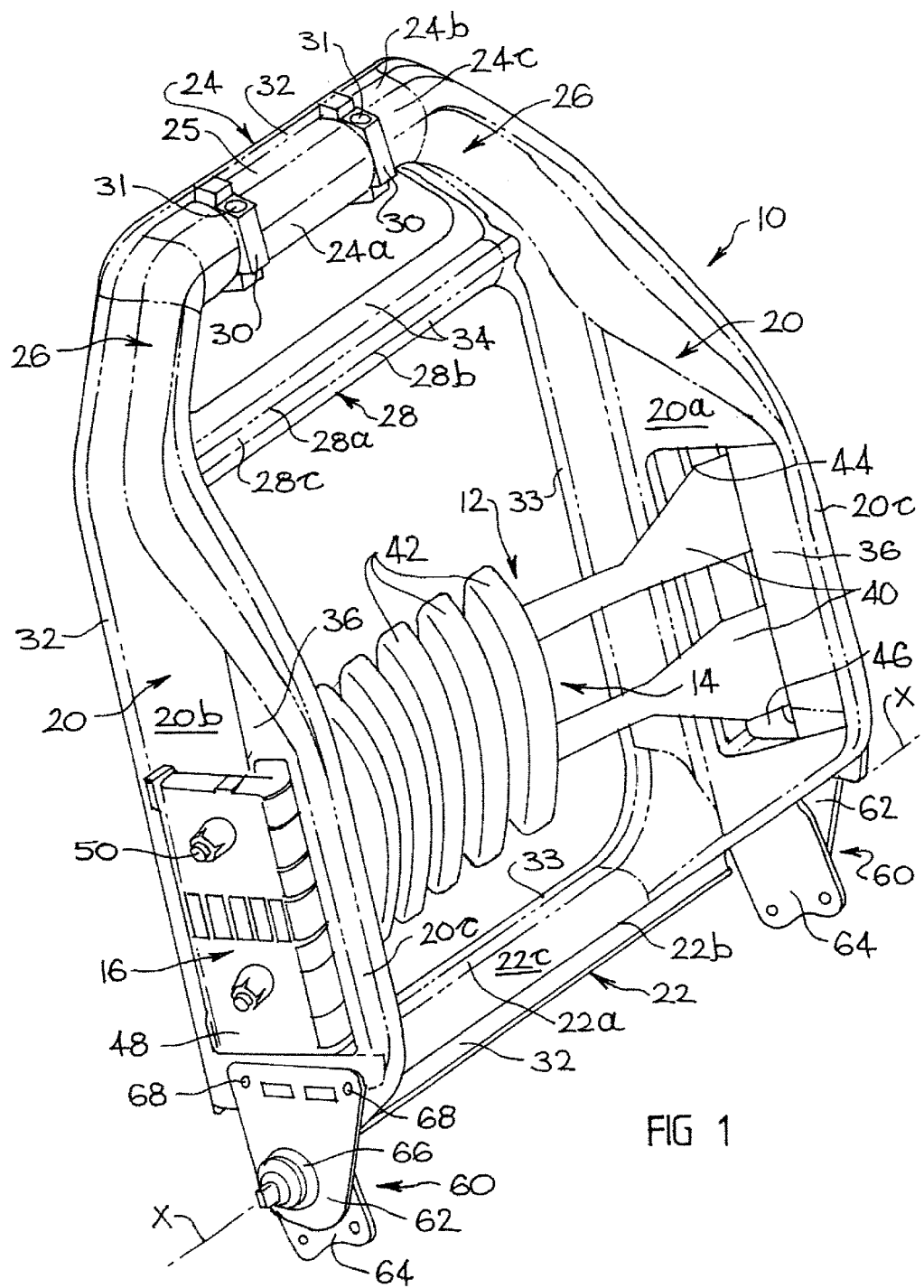

This application is the national phase under 35 U.S.C. §371 of PCT International Application No. PCT/AU97/00660 which has an International filing date of Oct. 3, 1997 which designated the United States of America.

This invention relates to an improved frame for a seat backrest and to a seat backrest and/or seat incorporating this frame.

The invention has particular application to seats for automobiles. For ease of description, the invention is illustrated with reference to that application. However, it is to be understood that the seat backrest frame of the invention can be used in seats other than automotive seats.

In known forms, the frame for a vehicle seat backrest usually is made from components of steel tubing or pressed steel plate. The components are shaped and assembled to provide a somewhat rectangular peripheral frame, with this usually being strengthened by at least one transverse member which is secured to and extends between respective side portions of the peripheral frame. Usually, a transverse member is provided between the side portions at what is to be an upper region of the frame in a normal in-use orientation. Also, a longitudinally adjustable band of resilient material, such as a suitable plastics material, often is provided between the side portions, at a lower region of the frame, to enable lumbar region adjustment of a seat backrest in which the frame is to provide structural form.

With known forms of frame, padding, such as foam plastics, horsehair, jute fibre (often rubberised) and polyester or other synthetic fibre, is provided over the frame and any transverse member. An outer cover, such as a fabric or leather cover, then is fitted over the frame and foam padding to provide a finished seat back. The padding of course is provided to impart a suitable contour form to the seat backrest for the comfort and support of a user, while the outer cover is to assist in retaining the padding in relation to the frame and to provide a suitable finish. The form and thickness of the padding also is to be such as to protect a user against injury from the relatively rigid frame in the event of a vehicle impact.

To accommodate typical impact loadings, the steel components used to form the frame needs to be of a gauge providing sufficient strength to withstand at least usual loading levels, as specified in legislation or regulations in various countries. As a consequence, the weight of the frame is substantial, despite vehicle manufacturers being concerned with reducing weight in all components to the extent that this is consistent with safety requirements.

In addition to the substantial weight of the steel frame, it is to be appreciated that the weight of padding is substantial. Thus, while the padding has a low density relative to the frame per se, the volume of foam or other material necessary to form the padding, and hence the weight of padding, is substantial. In a typical vehicle seat back, the foam padding contributes approximately 25% of the weight. Also, padding is expensive, particularly as defects in its production is a major cause of rejects. Moreover, the padding usually is shaped so as to provide wing portions of a vehicle seat back, to function as lateral restraints for a user, although the padding has relatively low resistance to deformation and gives way in side impacts, and then is unable to provide such restraint. The resistance of the padding can be increased by metal wire or metal plate reinforcement but this also can deflect under side impacts.

There accordingly is a number of deficiencies in the known forms of vehicle seat backrest frames, and in backrests including these frames. The present invention is directed to overcoming at least some of these deficiencies by providing an improved seat backrest frame and a backrest and/or seat including the improved frame.

A seat backrest frame according to the present invention is in the form of a rigid peripheral frame structure which, relative to an in-use orientation, has frame portions including laterally spaced, upstanding side portions, an upper transverse portion which joins the upper ends of the side portions and a lower transverse portion which joins the lower end of the side portions. The frame structure also may include a further transverse portion which joins the side portions at an intermediate level, preferably a minor part of the length of the side portions below the upper transverse portion.

The frame structure is integrally formed by casting from a suitable light alloy or by moulding from a suitable engineering plastics material. Each frame portion is of elongate channel form, defined by respective side flanges and an interconnecting web, with the web disposed forwardly of the frame structure and the channel of each frame member opening rearwardly. The rear edge of the side flanges of each frame portion may be on or closely adjacent to a common plane, while the transverse members may be of substantially uniform section throughout a major portion of their length. However, each side portion, over at least the lower half of its length, defines a respective forwardly projecting wing (or bulge) in which the depth of its channel is substantially greater than the depth of the channel of each transverse portion.

The wing of each side portion is such as to provide a number of significant benefits. The first is that each wing results in the frame providing for lateral restraint of an occupant for a seat having the back rest frame. Thus, while it is desirable that a layer of padding be provided over the frame, including each wing, the overall volume of padding is able to be substantially less than is required with known forms of backrest frames. This is particularly the case where, in the known frames, the padding itself is to define a wing portion for such restraint.

A further practical benefit is that a chamber defined in each wing, as a result of enlargement of the channel of each side portion, can be used to house ancillary devices. Thus, one or each wing can accommodate an airbag or cushion device which is inflatable forwardly through a suitably positioned opening of the side portion for the benefit of the seat occupant, in the event of a collision. Alternatively, the wing can accommodate such airbag, or a further airbag, which is rearwardly inflatable for the benefit of a rear seat occupant. Additionally, or alternatively, each wing can accommodate therein a part of the anchoring and/or adjustment mechanism for a lumbar support device to be incorporated in a seat-back having the frame. Additionally, or alternatively the wing can accommodate at least one motor drive for various power operated systems in the seat, such as a lumbar adjuster or a power recline adjuster.

The side portions may be substantially parallel. The upper and lower portions may extend generally at right angles to the side portions. However, the upper portion, or each of the upper and lower portions, may have end sections which are inclined slightly relative to a mid-section thereof, such that the generally rectangular form of the frame has inclined upper, or upper and lower shoulders by which the lower and upper portions merge with each side portion.

As indicated, the frame may include at least one further transverse member which extends between and is connected to, or integral with, each side portion. Preferably such further transverse member is spaced from the upper portion by a minor part of the length of the side portions, so as to be located in an upper part of the frame when the latter is in an in-use orientation.

The frame portions are such that the frame is in the form of a hollow shell structure which is open at the rear thereof along substantially the full length of each frame portion. That is, each frame portion may comprise only its side and front walls, so as to be of channel form. The arrangement can be such that, in the in-use orientation of the frame, a continuous rearwardly open channel is defined around the frame.

The or each further transverse member may be of similar cross-section to the frame portions. Thus, a transverse member can be of channel form, such as with a rearwardly open channel.

The frame may be formed integrally with any further transverse member, and this preferably is the case. Where the frame is cast, it most preferably is produced from a suitable light alloy comprising a magnesium, aluminium or zinc alloy, such as by pressure die casting. The use of a magnesium alloy is preferred. Where the frame is moulded, it may be produced from a suitable high strength engineering plastics material, such as by injection or compression moulding. The frame also can be compression moulded from a composite material such as synthetic mineral, or ceramic fibre reinforced plastics material. Alternatively, the frame may be moulded from fibre-reinforced plastics material, by use of conventional procedures, such as by laying-up fibrous material in a mould, applying a suitable plastics material to the fibrous material, and then curing the plastics material.

The frame of the invention has the benefit of enabling it to be of thin-walled construction, with walls as thin as from 2 to 3 mm, or even less. The actual thickness can vary with the structural material used, and the method appropriate for production of the frame from that material. Also, depending on requirements, the wall thickness can vary in different parts of the frame, as detailed later herein.

The frame according to the invention may, and preferably does, have a cross-section which is greater than that typical of the known tubular steel frames. In one form of the invention, the frame is such that it contributes substantially to the overall profile form or configuration of a seat backrest of which it forms a part. Thus, the frame may be such that it provides part of the function of padding in the known form of seat backrests, in that the padding can be used principally only to provide for passenger comfort rather than also to define the profile or configuration of the seat backrest.

In the known form of the steel frame for a vehicle seat backrest, in which components are of tubular steel, the latter is of a minimum diameter and wall thickness consistent with achieving a required balance between weight and rigidity. Similar considerations apply where the components are of pressed steel plate. In each case, the steel frame contributes to the overall somewhat rectangular form of the seat backrest, but not to other factors of the backrest profile or configuration. That is, the known steel frame does not as a practical matter, provide the depth, profile or configuration of the seat, while it usually does not provide for substantial lateral constraint. Rather, these factors are provided by the padding and any wire or plate reinforcement in the padding and, as indicated, this necessitates the use of a substantial volume, and hence weight, of padding.

Whereas the tubular or pressed steel components of the known forms of frame may have an outside diameter of about 20 mm to 30 mm, the frame portions of the frame of the invention most preferably have cross-sectional dimensions substantially in excess of such diameter. While those dimensions can vary from one frame portion to another, and even in a given frame portion, the dimensions may be a minimum of 35 mm or more in both the spacing between the inner and outer side walls (ie. in the width of the channel) and also in the depth of those walls (ie. in the depth of the channel). Moreover, in each side portion of the frame, at least at a lower extent of each at which a wing is defined, the depth of its side walls and/or the spacing therebetween can be substantially greater than such dimensions. In such lower extent, the dimensions may be up to about 160 mm for the depth of the side walls, and up to about 90 mm for the spacing between them.

As will be appreciated, the frame of the invention can be such as to define a peripherally continuous channel, or a respective channel in each of its frame portions, which is of substantial volume. Relative to the known form of frames, this represents a volume in which the provision of padding is not required. Also, in the case of part of the volume defined in a lateral restraint lower portion of the side portions, the frame as indicated enables accommodation of power motor devices and/or of anchoring and adjustment means for an adjustable lumbar support for a seat backrest and, if required, accommodation for an inflatable safety air-bag for lateral protection of a user in the event of a collision.

Figure 2:
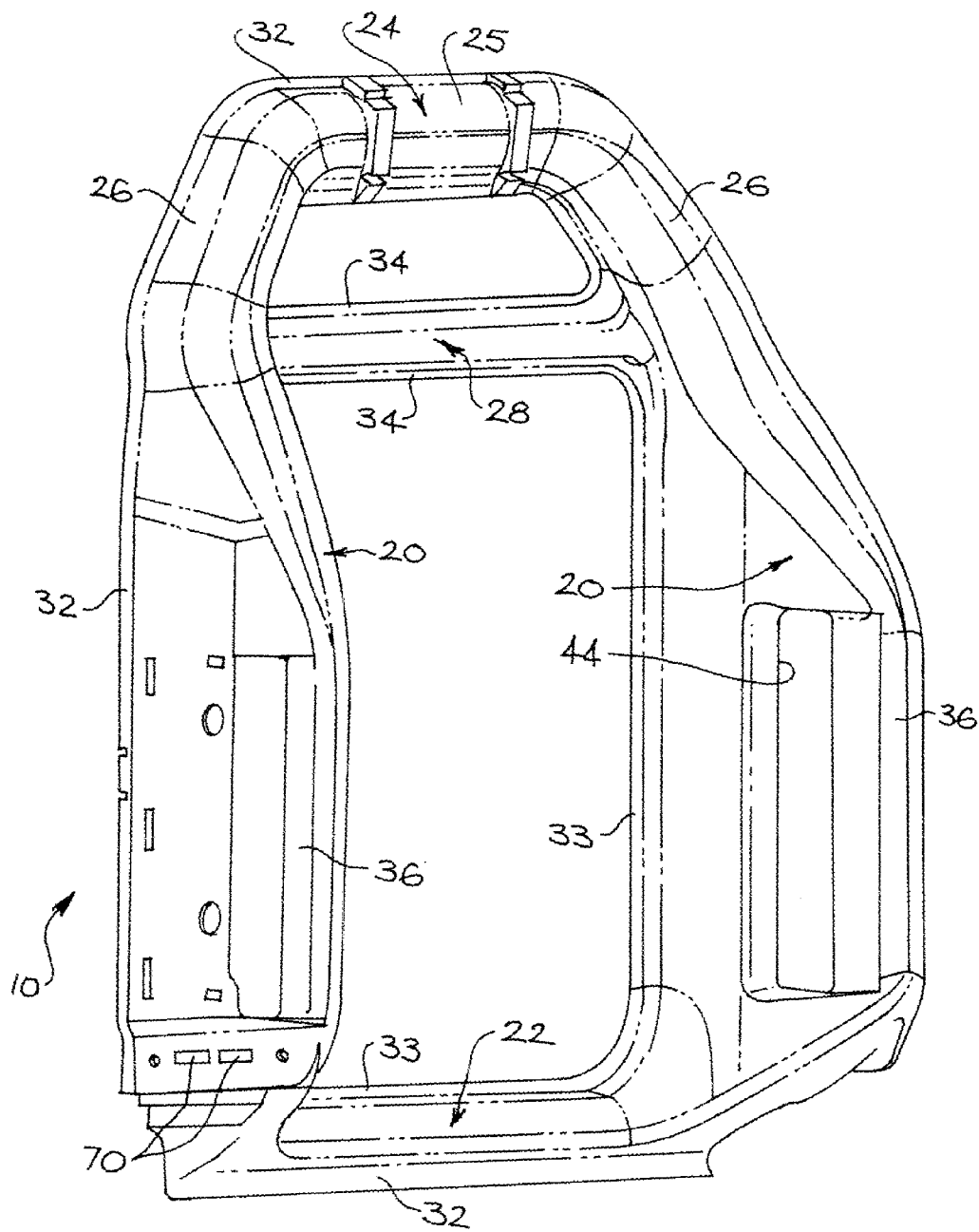

In order that the invention may more readily be understood, description now is directed to the accompanying drawings, in which:

FIG. 1 is a front perspective view of a seat backrest frame according to the invention, having an adjustable, lumbar support mechanism fitted thereto; and FIGS. 2 and 3 respectively show a front and rear perspective view of the frame of FIG. 1, but without the lumbar support mechanism.

In the drawings, the backrest frame is designated generally by the reference numeral 10. In FIG. 1, the lumbar support mechanism is shown generally at 12 and includes a transverse portion 14 providing lumbar support and an adjustment mechanism 16 enabling adjustment of portion 14 and, hence, the extent of lumbar support.

The backrest frame 10 is of integral construction and it preferably is formed by high pressure die casting from an aluminium or zinc alloy, but most preferably from a magnesium alloy. However, as indicated above, frame 10 could be moulded from a plastics material of suitable strength, such as by injection moulding from an engineering plastics, cast from a fibre-reinforced plastics resin, or compression moulded from plastics sheet material.

Frame 10 is of somewhat rectangular form and, relative to a normal in-use orientation as shown, includes laterally opposed, upright side members 20, a lower transverse member 22 which joins members 20 at the lower end thereof, and an upper transverse member 24 which joins members 20 at the upper ends thereof. Upper member 24 has respective end portions 26 which are inclined downwardly and outwardly from a mid-portion 25 thereof to merge with side members 20. Also, frame 10 includes an optional transverse bracing member 28 which extends between each side member 20, adjacent to the junction between each member 20 and a respective end portion 26 of upper member 24.

A short distance inwardly from each of its portions 26, portion 25 of upper member 24 has a respective boss 30 through which an upwardly disposed bore 31 extends. Each bore 31 is able to accommodate a respective leg of a headrest (not shown) which is able to be fitted to frame 10. The member 28, in addition to providing bracing between side members 20, also is able to act to reduce the hazard presented by the lower end of each leg of the headrest.

Each of side members 20 and transverse members 22, 24 and 28 is of elongate form. In front elevation, as shown in FIGS. 1 and 2, each of these members of frame 10 has the appearance of being of solid, or tubular form. However, as is evident from FIG. 3, each of side members 20 and transverse members 22, 24 and 28 is U-shaped in cross-section such that it is of rearwardly open channel form, and such that frame 10 is in the form of a hollow, rearwardly open shell, for example of from 2 to 3 mm wall thickness. Thus, each of the members 20, 22 and 24 has a respective inner side wall 20a, 22a and 24a, a respective outer side wall 20b, 22b and 24b and a transversely arcuate, front wall or web 20c, 22c and 24c joining the respective side walls. The outer walls 20b, 22b and 24b define the outer periphery of frame 10, while each of members 20, 22 and 24 defines along its length a rearwardly open channel 20d, 22d and 24d.

Similarly, bracing member 28 has respective side walls 28a and 28b which are joined by a transversely arcuate front wall or web 28c, and defines a rearwardly open channel 28d. However, the depth of walls 28a and 28b (that is, the dimension in the fore to aft direction) is less than that for the side walls of members 20, 22 and 24, such that channel 28a is of lesser depth than channels 20d, 22d and 24d.

Around substantially the full outer periphery of frame 10, there is provided an out-turned flange 32, of which successive parts are defined at the rearward edge of outer side walls 20b, 22b and 24b. Also, around substantially the full inner periphery of frame 10, there is provided an in-turned flange 33, of which successive parts are defined at the rearward edge of inner walls 20a, 22a and 24a. Similarly, further such flanges 34 are provided along each side of member 28, with each flange 34 defined at the rearward edge of a respective one of side walls 28a and 28b of member 28. The flanges 32, 33 and 34 are to ensure that the respective rearward edges at which they are provided do not create a hazard to rear seat passengers during an impact event. Also, as indicated above, member 28 acts to reduce the hazard presented by the lower end of legs of a headrest and this is achieved by those ends contacting flange 34 of wall 28a of member 28, such that the ends of the headrest legs are prevented from projecting rearwardly of frame 10.

The successive channels 20d, 22d and 24d may be such as to define a continuous, rearwardly open channel around frame 10. However, the channel of each member 20, 22 and 24 preferably is partly discontinuous by provision of transverse bridging elements 35 integral with the respective side walls and front wall of each of those members. The rearward edge of each bridging element 35 is curved or otherwise set deeply enough within its channel to prevent a hazard, and possible head injury, for a rear seat passenger during an impact event.

The shell form of frame 10 is such that, relative to the known form of backrest frame of steel tubing, its members 20, 22, 24 and 28 occupy a substantially greater volume, while having a comparable or greater strength. Thus, for a given frame strength, the substantially increased volume is obtained without the need for an increase in frame weight. Where the frame 10 is cast from a light alloy, such as aluminium, zinc or magnesium alloy, or is moulded or cast from a suitable plastics material, a greater wall thickness can be necessary in members 20, 22, 24 and 28, than is required for a steel frame. However, despite that increase in wall thickness, a given frame strength level can be achieved in a frame 10 which is of substantially less weight than the known tubular steel frame.

The increase in volume relative to the known steel frame is indicated as being substantial. It can be such that a corresponding saving in volume of padding is achieved. While of relatively low density, the volume of padding required for use with the known steel frame is such that the weight of padding can amount to about 25% of the weight of a seat backrest. Thus, a substantial reduction in the volume of padding results in a further significant weight reduction in a seat backrest.

In the frame 10 good overall strength and a significantly enhanced volume to weight ratio is obtained by the shell-like form of the frame. Contributing factors are the width of the sidewalls of members 20, 22, 24 and 28 and the arcuate cross-section of their front walls or webs. The integral construction of frame 10 is a further contributing factor although, if required, transverse member 28 can be formed separately and secured in position by suitable means such as by retaining screws or, where relevant, by welding or high-strength resin bonding.

A further practical benefit able to be achieved with the shell-like form of the frame of the invention, and the methods for its construction is illustrated by frame 10. As shown in the drawings, each side member 20 progressively increases in front-to-rear depth from its upper end such that the lower extent of each defines a forwardly projecting wing portion 36. These portions 36 have a number of advantages, not the least of which are a substantial increase both in the volume enclosed by frame 10 and in the strength of frame 10 at its lower portion. Frame 10, as with most vehicle seat backrest frames, is intended to be mounted for pivotal adjustment about a transverse axis X—X adjacent to its lower extent, such that load concentrations necessitate increased strength in its lower portion.

The forwardly projecting portions 36, in providing further volume increase, enable a further corresponding reduction in the requirement for padding. However, they also define side wing structures which provide improved lateral restraint for an occupant. In some known backrests, such restraint is provided by the padding being shaped to form similar projections. However, the padding in large part simply acts as a comfort restraint under normal conditions since, as it is relatively readily deformable, it can provide only inadequate lateral restraint in the event of loadings experienced in vehicle side impacts.

The side wing structures provided by the forwardly projecting portions 36 have a still further benefit illustrated in FIG. 1. As shown therein, portions 36 are able to accommodate therein part of the anchoring and adjustment mechanism for the lumbar support mechanism 12. This substantially increases the integrity of anchoring of mechanism 12, as its ends are secured within and in relation to frame 10. Additionally, or alternatively, the enlarged channel 20d resulting from each projecting portion 36 of at least one of the side members 20 can be used to accommodate an inflatable air cushion, while an air cushion could additionally or alternatively be mounted externally to frame 10 on a portion 36. Such air cushion may expand rearwardly for the benefit of rear-seat occupants or forwardly through an opening (not shown) in frame 10 for the benefit of front seat occupants. Alternatively, there may be two air cushions, each expandable in a respective one of those directions. The reference to such occupants is on the assumption that frame 10 is used in the backrest of a front seat.

A suitable mechanism 12 can take a variety of forms. Rather than being of the specific form shown for mechanism 12, the lumbar support mechanism could be of the form disclosed in either of our International patent specifications PCT/AU95/00123 or PCT/AU95/00421. However, in each case, frame 10 provides for mounting of the mechanism at least partly in the projecting portions 36 of frame 10.

As shown in FIG. 1, transverse portion 14 of mechanism 12 is in the form of an elongate band 40 on which is mounted an array of upwardly extending projections 42 which may be separate or laterally inter-connected. One end of band 40 extends into a projecting portion 36 through an opening 44 in the inner wall 20a of first one of side members 20. Within that portion 36, the one end of band 40 is secured to a post 46 mounted in the channel 20d of the first member 20. The other end of band 40 projects through a similar opening 44 in the wall 20a of the second side member 20, with that other end of the band 40 being secured to an actuator (not shown) which forms part of adjustment mechanism 16 and which is mounted within the channel 20d of the second side member 20.

The portion of mechanism 16 shown in FIG. 1 includes a gear housing 48 mounted on the outer face of the outer wall 20b of the second side member 20. A shaft 50 for imparting drive (either manual or motor drive) to gears within housing 48 projects from the latter, while the gears are operatively connected to the actuator. Reversible rotation of shaft 50 causes band 40 to be tensioned or relaxed, enabling forward or rearward movement of projections 42 and corresponding lumbar support adjustment. Where no lumbar adjustment system is required the frame 10 may have at least one further transverse member 28. As an alternative, or in addition, to a further member 28, a suspension system consisting, for example, of a mat or wires and springs, may be strung across the frame.

The frame is intended to be secured to the frame of a seat base so as to be pivotable relative to the base frame about axis X—X. A suitable respective coupling 60 for this purpose is shown in FIG. 1 at the lower corners of frame 10, while FIGS. 2 and 3 shown the construction of frame 10 to facilitate its securement to coupling 60.

Each coupling 60 includes an upper bracket 62 and a lower bracket 64, and a journal connection 66 which interconnects brackets 62 and 64. The upper end of each bracket 62 is secured to the outer wall 20b of the respective side member 20 by fasteners 68, or it may be made integral to the frame 10. Each bracket 64 is similarly secured to a respective side of the base frame, while connectors 66 define pivot axis X—X. The frame 10 may be connected to a seat base frame using either a dual rotary, infinitely variable recliner system as shown, or by a single sided rotary recliner system. Alternatively, other known recliner systems, such as a lever or linear recliner, can be adapted for use with the seat back frame of the invention.

While not shown, the mounting of frame 10 on a seat base includes means for adjustably retaining frame 10 at a suitable inclination with respect to the seat base.

Finally, it is to be understood that various alterations, modifications and/or additions may be introduced into the constructions and arrangements of parts previously described without departing from the spirit or ambit of the invention.

What is claimed is:

1. A seat backrest frame having a rigid peripheral frame structure which, relative to an in-use orientation, has a plurality of frame portions including laterally spaced, upstanding side portions, an upper transverse portion joining upper ends of said side portions and a lower transverse portion joining lower ends of said side portions, wherein each of said frame portions has an elongate channel form defined by respective side flanges and an interconnecting web, each said web is disposed forwardly with respect to said frame structure with the channel of each said frame portion opening rearwardly, each frame portion has an outer one of said respective side flanges such that the outer side flanges together define an outer periphery of the frame structure, each web is transversely arcuate so as to curve rearwardly to each respective side flange, each said side portion defines a forwardly projecting wing over at least the lower half of its length, such that the depth of each side portion channel in at least the region of said wing is substantially greater than the depth of said channels of said respective upper and lower transverse portions and such that each side portion progressively increases in front-to-rear depth from an upper end part of its length to the respective said wing, and wherein said peripheral frame structure is integrally formed by pressure die casting a light alloy selected from magnesium, aluminum and zinc alloys.

2. A seat backrest frame according to claim 1, wherein said side portions are substantially parallel and said upper and lower portions extend generally at right angles to said side portions.

3. A seat backrest frame according to claim 2, wherein the or each of said upper and lower portions have end sections which are inclined slightly relative to mid-sections thereof, such that said peripheral frame structure of said frame has upper and/or lower shoulders.

4. A seat backrest frame according to claim 1, wherein a continuous rearwardly open channel is defined by said frame portions fully around said seat backrest frame.

5. A seat backrest frame according to claim 1 including at least one further transverse portion joining said side portions intermediate said upper and lower transverse portions.

6. A seat backrest frame according to claim 5, wherein a said further transverse portion is disposed below said upper transverse portion a minor part of the length between said upper and lower transverse portions.

7. A seat backrest frame according to claim 5, wherein the or each of said further transverse portions is of the same or similar cross section to said frame portions.

8. A seat backrest frame according to claim 5, wherein the or each of said further transverse portions is formed integrally with said frame.

9. A seat backrest frame according to claim 5, wherein the or each of said transverse portions is formed separately from said frame and is secured in position by securing means.

10. A seat backrest frame according to claim 9 wherein said securing means are retaining screws, welding, or high strength resin bonding.

11. A seat backrest frame according to claim 1, wherein the rear edges of said side portions of each said frame portion are on or are closely adjacent a common plane.

12. A seat backrest frame according to claim 1, wherein each transverse portion is of substantially uniform section throughout a major portion of its length.

13. A seat backrest frame according claim 1, wherein the channel of each of said side portions in the region of said wings defines a chamber available for housing one or more ancillary devices for use in a seat incorporating said frame.

14. A seat backrest frame according to claim 13, wherein one or both of said chambers can house at least a portion of an anchoring and/or adjustment mechanism for a lumbar support device.

15. A seat backrest frame according to claim 13, wherein one or both of said chambers can house at least one motor drive for driving systems used in a seat incorporating said frame.

16. A seat backrest frame according to claim 1, wherein said frame, when in use as part of a seat backrest, contributes substantially to the configuration of the backrest.

17. A seat backrest frame according to claim 16, wherein said frame contributes to the configuration of the backrest so as to provide for substantial lateral constraint of an occupant of the seat to which the backrest is applied.

18. A seat backrest frame according to claim 1, wherein said side flanges of each of said frame portions are spaced apart a minimum of 35 mm and the depth of said side flanges is a minimum of 35 mm.

19. A seat backrest frame according to claim 1, wherein the side flanges of said side portions in the region of said wings have a maximum depth of about 160 mm and are spaced apart a distance up to about 90 mm.

20. A seat backrest frame according to claim 1, wherein said upper transverse portion includes means to fit a headrest.

21. A seat backrest frame according to claim 20, wherein said fittings means includes a boss spaced toward either end of said upper transverse portion, each said boss including a bore suitable to accommodate a respective leg of a headrest for fitting to said frame.

22. A seat backrest frame according to claim 1, further including a suspension or cushioning system extending across said side portions and/or said upper and lower transverse portions.

23. A seat backrest frame having an integrally formed rigid peripheral frame structure which, relative to an in-use orientation, has a plurality of frame portions including laterally spaced, upstanding side portions, an upper transverse portion joining upper ends of said side portions and a lower transverse portion joining lower ends of said side portions, each of said frame portions having an elongate channel form defined by respective side flanges and an interconnecting web, each said web being disposed forwardly of said frame structure with the channel of each said frame portion opening rearwardly, each said side portion defining a forwardly projecting wing over at least the lower half of its length, such that the depth of each side portion channel in at least the region of said wing is substantially greater than the depth of said channels of said respective upper and lower transverse portions, wherein the seat backrest frame includes at least one further transverse portion joining said side portions intermediate said upper and lower transverse portions and wherein the channel depth of the or each of said further transverse portions is less than the channel depth of said frame portions.

24. A seat backrest frame having an integrally formed rigid peripheral frame structure which, relative to an in-use orientation, has a plurality of frame portions including laterally spaced, upstanding side portions, an upper transverse portion joining upper ends of said side portions and a lower transverse portion joining lower ends of said side portions, each of said frame portions having an elongate channel form defined by respective side flanges and an interconnecting web, each said web being disposed forwardly of said frame structure with the channel of each said frame portion opening rearwardly, each said side portion defining a forwardly projecting wing over at least the lower half of its length, such that the depth of each side portion channel in at least the region of said wing is substantially greater than the depth of said channels of said respective upper and lower transverse portions, wherein the channel of each of said side portions in the region of said wings defines a chamber available for housing one or more ancillary devices for use in a seat incorporating said frame, and wherein at least one airbag is housed within one or both of said chambers, in a manner permitting either rearward or forward inflation.

25. A seat backrest frame according to claim 24, wherein forward inflation of said airbag or airbags takes place through an opening suitably positioned in the relevant side portion.

26. A seat backrest frame having an integrally formed rigid peripheral frame structure which, relative to an in-use orientation, has a plurality of frame portions including laterally spaced, upstanding side portions, an upper transverse portion joining upper ends of said side portions and a lower transverse portion joining lower ends of said side portions, each of said frame portions having an elongate channel form defined by respective side flanges and an interconnecting web, each said web being disposed forwardly of said frame structure with the channel of each said frame portion opening rearwardly, each said side portion defining a forwardly projecting wing over at least the lower half of its length, such that the depth of each side portion channel in at least the region of said wing is substantially greater than the depth of said channels of said respective upper and lower transverse portions, wherein bridging elements extend transversely across the channels of said frame portions, said bridging elements being integral with each of said side flanges and said interconnecting web, said elements having a curved free edge curving inwardly toward said web, or being set inwardly of said channel opening.

27. A seat backrest frame having an integrally formed rigid peripheral frame structure which, relative to an in-use orientation, has a plurality of frame portions including laterally spaced, upstanding side portions, an upper transverse portion joining upper ends of said side portions and a lower transverse portion joining lower ends of said side portions, each of said frame portions having an elongate channel form defined by respective side flanges and an interconnecting web, each said web being disposed forwardly of said frame structure with the channel of each said frame portion opening rearwardly, each said side portion defining a forwardly projecting wing over at least the lower half of its length, such that the depth of each side portion channel in at least the region of said wing is substantially greater than the depth of said channels of said respective upper and lower transverse portions, wherein the seat backrest frame includes an out-turned flange extending around substantially the full outer periphery of said frame and an in-turned flange extending around substantially the full inner periphery of said frame, each respective flange depending from the rear edges of said frame portions.

28. A seat backrest frame according to claim 27, wherein said further transverse portions include flanges depending from the rear edges of said side flanges.

* * * * *